March 13, 1951  G. R. McDONALD  2,545,368
ELECTRICAL POWER CONTROL CIRCUIT
Filed May 21, 1949
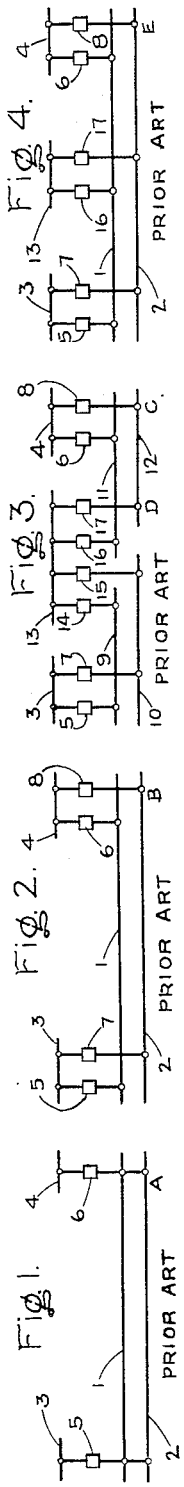
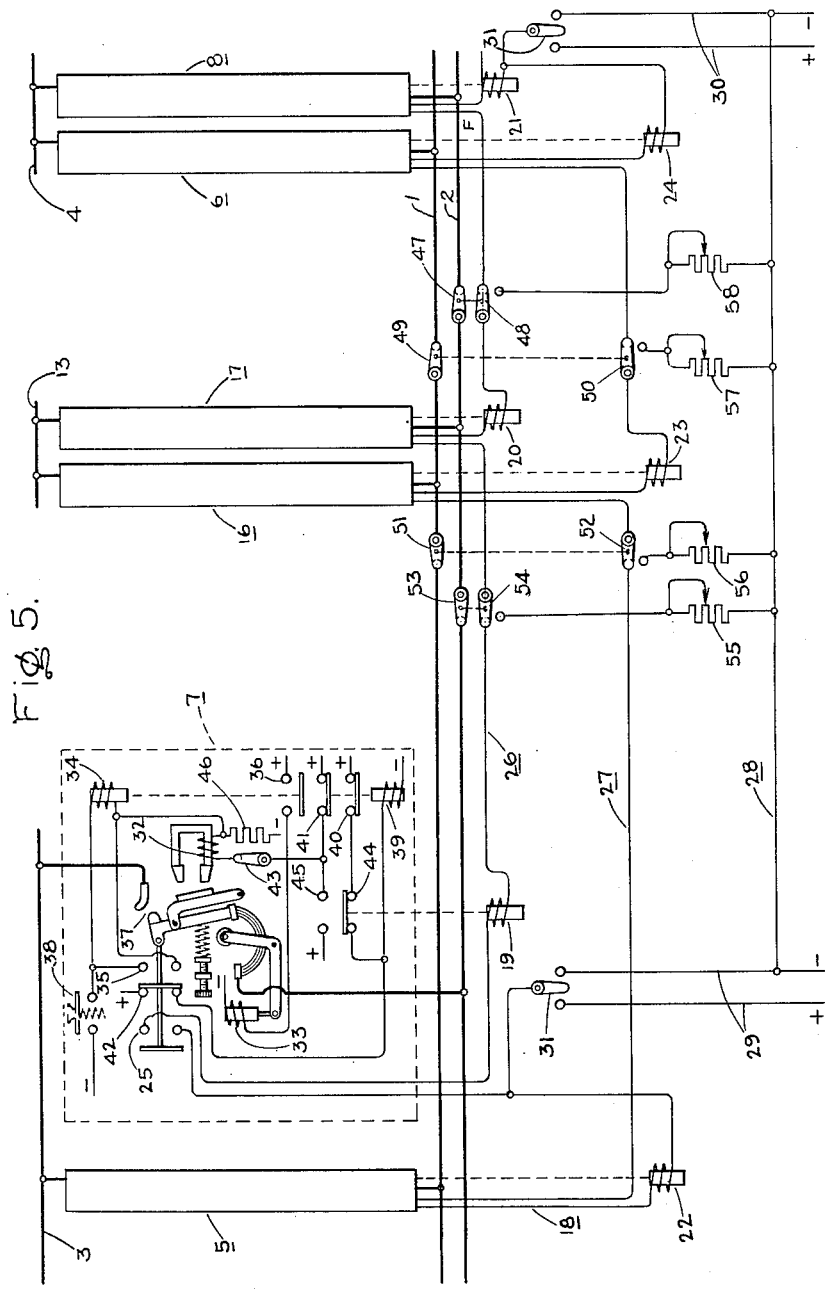
Inventor:
Gordon R. McDonald,
by Ernest H. Britton
His Attorney.

Patented Mar. 13, 1951

2,545,368

UNITED STATES PATENT OFFICE 2,545,368

ELECTRICAL POWER CONTROL CIRCUIT

Gordon R. McDonald, Erie, Pa., assignor to General Electric Company, a corporation of New York Application May 21, 1949, Serial No. 94,620

1 Claim. (Cl. 175—294)

This invention relates to electrical power control circuits and more particularly to an electrical arrangement suitable for application to a particular electrical power system to reduce the size of power lines and the number of circuit breakers required to provide automatic isolation of any power line in the system having an electrical fault thereon and to provide for independent supervisory control of individual circuit breakers to control such a power line until the electrical fault is eliminated. It is to be understood that such independent supervisory control may be local manual, remote manual, or local automatic although in the following description for convenience reference will be made only to manual supervisory control.

The type of electrical system to which I refer is one wherein a plurality of power lines are supplied with electrical energy at remote points along the power lines from power sources common to each of the power lines at such points.

As an example, an electrical trolley line system may have a plurality of tracks each supplied with electrical power from an associated overhead power line. Such power lines are conventionally supplied with electrical power from electrical substations located along the tracks at points as far removed one from the other as a practical use of copper in the overhead power lines will permit.

In such an electrical system, it is desirable to reduce to a practical minimum the required cross-sectional size of power lines for a given load and to do this in a conventional manner a tie line station may be provided between adjacent power sources electrically interconnecting the power lines through circuit breakers.

It is also desirable in such a system to provide means for isolating any power line having an electrical fault thereon. This may be accomplished in a conventional manner by increasing the number of tie breakers and sectionalizing the lines. However, such an expedient involves the cost of additional tie breakers and a corresponding increase in the size of tie line stations.

It is an object of this invention to provide in such a system an electrical arrangement reducing the number of tie breakers necessary to maintain the power lines at a minimum practical cross-sectional size while at the same time providing for automatic isolation of any power line having an electrical fault thereon.

It is a further object to provide in addition to the above an arrangement for independent operation of each circuit breaker associated with a particular power line having an electrical fault thereon until the electrical fault is cleared and automatic control is re-established.

Another object is to provide in addition to the above an arrangement for manually isolating a portion of a power line having an electrical fault thereon after the power line itself has been isolated to re-establish the remainder of the power line as part of the system and to re-establish automatic control thereon.

In general, my invention comprises a pilot wire control circuit arranged to act in cooperation with circuit breakers connected to the power lines and with additional relays and contacts on the circuit breakers to trip all of the circuit breakers supplying power to a particular power line when one of the circuit breakers connected to that line operates in response to an electrical fault thereon, and to provide manual supervisory control of individual circuit breakers thereafter until the electrical fault is cleared and automatic control is re-established.

For a complete understanding of my invention, reference should be had to the following specification and the accompanying drawing wherein like members are given the same numerical reference throughout the drawing.

In the drawing, Figs. 1–3 are diagrammatical views of various conventional circuit breaker arrangements of an electrical trolley system used to explain my invention, Fig. 4 is a diagrammatical view of a circuit breaker arrangement to be used as part of my invention, and Fig. 5 is a diagrammatical view showing the application of my invention to the circuit breaker arrangement shown in Fig. 4.

Referring to the drawing, I have shown in Figs. 1–3 various conventional circuit breaker arrangements for a two track trolley system used to provide a background for a complete understanding of my invention. To simplify the drawing, I have shown only the positive overhead power line circuits and have omitted the negative rail circuits which are not necessary for an understanding of my invention.

In connection with any distribution system there is a fundamental concept which dictates that feeder circuit breakers must have an overload setting sufficiently high to carry normal loads, but should trip on short circuits or electrical faults to isolate a defective section of the system. Therefore, assuming an electrical system with simple overload tripping of the circuit breakers, in such a system the breakers should be set to trip at a higher current value than the expected load swings. Moreover, the resistance of the circuits must be such that a short circuit or electrical fault produces a sufficient current to cause tripping of all of the circuit breakers involved in supplying the electrical fault.

Assuming a two track trolley system as shown in Fig. 1 wherein two power lines 1 and 2 represent the overhead power lines for two trolley tracks (not shown), electrical power could be supplied to such lines by two electrical substations 3 and 4 located at remote points along the power lines 1 and 2 and electrically connected thereto by two circuit breakers 5 and 6, as shown in Fig. 1.

In such an arrangement, a short circuit at A will trip the circuit breaker 6 but may not trip the circuit breaker 5 because of the resistance of the power lines 1 and 2. Thus power may be supplied to the electrical fault until it is burned off or power lines 1 and 2 are damaged by overheating and annealing of the copper and, therefore, both power lines 1 and 2 or the whole system is affected thereby.

As a further step two circuit breakers may be provided at each substation by adding circuit breakers 7 and 8 as shown in Fig. 2, thus supplying electrical power to each of the power lines 1 and 2 separately. In this arrangement, only power line 2 is involved in an electrical fault at B. However, since line 2 is supplied with electrical power from one continuous circuit, although circuit breaker 8 opens in response to an electrical fault at B still circuit breaker 7 may remain closed and there is no way to isolate the electrical fault.

To reduce the cross-section of copper required in power lines 1 and 2 or alternatively to extend the spacing between substations 3 and 4, power lines 1 and 2 may be sectionalized as shown in Fig. 3 to form four power lines 9, 10, 11 and 12 electrically interconnected by a tie station 13 and four tie line circuit breakers 14, 15, 16 and 17. It should be noted at this point that all of the circuit breakers at the substations and the tie line station are arranged to trip in one direction only, that is, with current leaving the bus or tie line.

In this arrangement assuming a load located at C, the circuit breaker 8 will carry substantially all of this load. If the load is located at D, half of the current is supplied from each of the substations 3 and 4 and each of the power lines 9—12 supplies one quarter of the required current. That is, all of the copper in the lines 9—12 is effective in supplying a single load at this location. Breakers 14—16 each supply one quarter of the current into the tie station 13 and breaker 17 supplies three quarters of the current to the load.

Assuming the short circuit at C, circuit breaker 8 immediately trips and is followed by tripping of circuit breaker 17, thus isolating power line 12 and leaving the remainder of the system in operation.

Therefore, this arrangement has the advantages of isolating the portion of the system having an electrical fault thereon and of providing a maximum use of copper in the system to permit a reduction of the cross-section of copper used in the power lines or alternatively an advantage of spacing the substations further apart.

The use of a tie station and circuit breakers in this manner is conventional and, although it provides the advantages described above, it also entails the cost of additional tie station circuit breakers and a building commensurate in size to house the same. For example, a trolley system having four tracks would require 8 circuit breakers at each tie station and thus the cost of installation becomes considerable.

To reduce the number of required tie station circuit breakers while at the same time providing a maximum use of copper in the electrical system an electrical arrangement as shown in Fig. 4 may be used. In this arrangement sectionalizing of the power lines is omitted and two continuous power lines 1 and 2 are used. Tie station 13 is retained as are the tie station circuit breakers 16 and 17, breakers 14 and 15 being omitted thereby reducing the tie station circuit breaker requirement 50 percent.

In this arrangement circuit breakers 16 and 17 are set at one-half the value used for the substation circuit breakers 5—8. Assuming an electrical fault at E, circuit breaker 8 trips. After circuit breaker 8 has tripped, circuit breaker 17 carries approximately two-thirds of the short circuit current and may trip depending upon the constants of the circuit. However, even though circuit breaker 17 does trip, the short circuit is still supplied by circuit breaker 7 which is too far removed from the electrical fault to trip in response thereto. Therefore, by providing a saving in the tie station circuit breakers in this arrangement, the advantage of interrupting the supply of electrical power to the electrical fault has been lost.

To provide for a maximum use of copper in the system, to interrupt the supply of electrical power to an electrical fault on a portion of the system, and to also maintain the advantage of reducing the number of required tie station circuit breakers by 50 percent as indicated in Fig. 4, in accordance with my invention, I provide an electrical arrangement as shown in Fig. 5.

In this arrangement the breakers are arranged as shown in Fig. 4 to provide the maximum use of copper in the system and the reduction in required tie station circuit breakers.

However, to provide for isolating a portion of the circuit having an electrical fault thereon thereby to eliminate the supply of power to the electrical fault, I provide a pilot wire automatic control circuit 18 arranged to be used in conjunction with the circuit breaker arrangement shown in Figs. 4 and 5. Pilot wire control circuit 18 comprises a plurality of pilot relays 19—24 electrically connected one to each of a plurality of contacts 25 provided one on each of the circuit breakers 5—8, 16 and 17. It should be noted at this point that to simplify the drawing I have shown the internal elements and connections only of circuit breaker 7 as the remaining circuit breakers are identical. The pilot relays 19—21 and the contacts 25 which are associated with circuit breakers 7, 17 and 8, that is, the pilot relays and the contacts 25 of all of the circuit breakers which supply electrical power to the power line 2, are connected in a series electrical circuit 26, as shown in Fig. 5. Pilot relays 22—24 and the contacts 25 which are associated with circuit breakers 5, 16 and 6, that is, the pilot relays and the contacts 25 of all of the circuit breakers which supply electrical power to power line 1 are connected in a second series electric circuit 27.

To supply electrical power to series circuits 26 and 27, I provide a common pilot control line 28 through which series circuits 26 and 27 are electrically connected to either of the direct current power sources 29 and 30 located one at each substation through switches 31.

Each of the circuit breakers 5—8, 16 and 17 are provided with a holding coil 32 a closing coil 33 and an auxiliary relay 34. Relay 34 is connected in parallel with a pair of normally open contacts 35 on its associated circuit breaker, and is provided with a pair of normally open contacts 36 through which electrical power is supplied to closing coil 33 to close the main contacts 37 of its associated circuit breaker when a supervisory switch 38 is closed to supply electrical power to relay 34.

A second auxiliary relay 39 is provided with two normally open pairs of contacts 40 and 41 and is connected to a source of negative potential and in series with a pair of normally closed contacts 42 on its associated circuit breaker through which contacts it is electrically connected to a source of positive potential. Contacts 41 of relay 39 are electrically connected to a source of positive potential and in series with holding coil 32 through a normally closed supervisory control switch 43. Contacts 40 of relay 39 are connected to a source of positive potential and in series with a pair of normally closed contacts 44 of the pilot relay associated with that particular circuit breaker. Contacts 44 are electrically connected to the positive potential side of relay 39 to seal relay 39 closed once it has been energized in a manner to be described later.

Each of the pilot relays 19—24 is also provided with a pair of normally open contacts 45 which are connected to a source of positive potential indicated and in series with the holding coil 32 of the circuit breaker associated with that pilot relay through the normally closed supervisory switch 43. Each of the circuit breakers have the same electrical components and wiring except that the contacts 25 of respective circuit breakers 5—8, 16 and 17 are connected respectively to pilot relays 19—24.

In operation, assuming all of the circuit breakers to be in open position as indicated in Fig. 5, the relay 39 of each circuit breaker is energized through the normally closed contacts 42 of its associated circuit breaker and the contacts 40 and 41 of relay 39 are thereby closed as indicated in Fig. 5. To close circuit breaker 7, its supervisory switch 38 is closed thereby completing an electrical circuit through relay 34, holding coil 32, normally closed supervisory switch 43 and contacts 41 of relay 39. Relay 34 having been thus energized its normally open contacts 36 are closed thereby energizing closing coil 33 to close circuit breaker 7.

When circuit breaker 7 is closed, its contacts 25 and 35 are closed and its contacts 42 are opened. By closing contacts 25 a portion of the series circuit 26 from the control power source 29 to the pilot relay 19 is completed. However, the series circuit 26 remains open because similar contacts 25 of circuit breakers 17 and 8 are still open since these circuit breakers have not yet been closed. The closing of contacts 35 of circuit breaker 7 short circuits and deenergizes the relay 34 to open its contacts 36 and de-energize the closing coil 33 while at the same time providing a parallel path to maintain the holding coil 32 energized and thereby to hold the circuit breaker 7 in closed position. When supervisory switch 38 opens, the circuit breaker 7 is held closed by a circuit through resistor 46. The opening of contacts 42 interrupts one source of positive potential to relay 39. However, since relay 39 was energized when circuit breaker 7 was open, it has sealed itself closed through contacts 44 of the associated pilot relay 19 and its contacts 40. Thus circuit breaker 7 is closed, remaining closed by the continued energization of its holding coil 32 through contact 41 of relay 39 and a portion of the series circuit 26 is completed to relay 19 which is associated with circuit breaker 7.

To complete the remaining portions of the series circuit 26, circuit breakers 17 and 8 may be closed in a similar manner to the previously described closing of circuit breaker 7 to close the normally open contacts 25 of circuit breakers 17 and 8. Thus series circuit 26 is completed and pilot relays 19, 20 and 21 are energized.

Series circuit 27 may be energized in a similar manner by closing circuit breakers 5, 16 and 6, that is, all of the circuit breakers supplying electrical power to power line 1.

When pilot relays 19—21 are energized, the contacts 44 thereof are thereby opened and contacts 45 are closed. The opening of contacts 44 de-energizes relay 39 and the closing of contacts 45 connects a positive potential source to the holding coil 32. By de-energizing relay 39, its contacts 40 and 41 are opened. The opening of contacts 41 would cause an interruption of power supply to the holding coil 32 were it not for the fact that contacts 45 of pilot relay 19 having closed thereby have provided an alternate circuit completing the holding coil circuit. Therefore, the holding coil remains energized and the circuit breakers 7, 17 and 8 remain closed.

When pilot relays 22—24 are energized by closing the circuit breakers 5, 16 and 6 the holding coils thereof are maintained energized in the same manner as described above and the breakers remain closed.

Referring now in particular to power line 2 and its associated circuit breakers and series circuit, that is, circuit breakers 7, 17 and 8 and series circuit 26, and assuming an electrical fault on power line 2, as for example at F, in this case circuit breaker 8 operates to open position in response to the electrical fault at F thereby opening its contacts 25 to interrupt the series circuit 26, and cause pilot relays 19, 20 and 21 to be de-energized. When pilot relays 19, 20 and 21 are thus de-energized contacts 45 of each of the pilot relays are opened to interrupt the supply of current to the holding coils 32 and trip the circuit breakers 17 and 7. Thus all of the circuit breakers involved in supplying electrical current to an electrical fault at F are operated to open position to clear that fault in response to the operation of the one of the circuit breakers which is sufficiently close to the electrical fault to be operated in response thereto. Thus power line 2 is isolated in the event of an electrical fault thereon.

In the event of an electrical fault on power line 1 the breaker nearest the fault operates in response thereto to de-energize series circuit 27 and trip the remaining circuit breakers associated with line 1 and supplying power thereto.

When power line 2 is cleared of an electrical fault by opening the circuit breakers 7, 17 and 8, the contacts 42 of each of the circuit breakers are closed thus re-energizing relays 39 and closing their contacts 40 and 41. Contacts 40 with contacts 44, which are now closed since pilot relays 19, 20 and 21 are opened, seals the relays 39 closed. Contacts 41 of relays 39 connect the holding coil 32 of each circuit breaker to a source of positive potential to provide manual supervisory control of each of the circuit breakers 7, 17 and 8 until the fault is cleared and all of the circuit breakers are closed to re-energize the series circuit 26 and re-establish automatic pilot relay control. That is, supervisory switch 38 of a particular circuit breaker may be closed to close that breaker and supervisory switch 43 may be opened to de-energize the holding coil 32 to open the circuit breaker.

To isolate a particular section of lines 1 or 2 having an electrical fault thereon to permit maximum utilization of the remaining part of the line, as a modification of my invention, I provide disconnecting switches 47—54 in lines 1 and 2 and pilot circuits 26 and 27 and indicated in Fig. 5 and I further provide adjustable resistors 55—58 each having one end electrically connected to the common pilot control wire 28 and having their other ends respectively arranged to be connected to respective disconnecting switches 54, 52, 50 and 48 when these switches are opened. Also I provide mechanical interlocking of respective pairs of switches 53 and 54, 51 and 52, 49 and 50 and 47 and 48.

To show the effect of this arrangement assume, for example, a permanent electrical fault on line 2 at F, in this case circuit breaker 8 opens in response to the fault at F and in turn opens circuit breakers 17 and 7 in the manner previously described to isolate line 2. This operation interrupts the supply of electrical current to the fault at F but also inactivates all of line 2. However, with the arrangement as immediately described above switches 47 and 48 which are mechanically interlocked may be opened to isolate the portion of line 2 between switch 47 and circuit breaker 8 and to isolate the portion of pilot circuit 26 including pilot relay 21 between switch 48 and the common pilot control line 28. Swith 48 in opening pilot circuit 26 also connects the portion of pilot circuit 26 including pilot relays 19 and 20 through the adjustable resistor 58 to the common pilot control line 28. Thus the adjustable resistance 58 is substituted in place of the portion of pilot circuit 26 including pilot relay 21 which has been isolated. Resistance 58 is adjusted to provide the same resistance as the isolated portion of circuit 26 to maintain a proper pilot relay current and therefore pilot relays 19 and 20 may now control the operations of circuit breakers 7 and 17 to re-establish automatic control on the portion of line 2 connected thereto in the same manner that circuit breakers 7, 17 and 8 operated with respect to the whole of line 2. That is, for an electrical fault on the remaining portion of line 2 connected to circuit breaker 7 and 17 the one of circuit breaker 7 or 17 nearest the fault will operate in response thereto to trip the remaining breaker and interrupt the supply of electrical current to the electrical fault.

Thus, by the modification above described, I have provided additional flexibility of the system by providing for further sectionalization of the lines 1 and 2 without the disadvantage of adding additional circuit breakers and have thus avoided the cost of additional circuit breakers and commensurate housing for the same.

It should be understood that although for simplification of the drawing and description, I have shown only one tie station between substations there are occasions where two or more tie stations may be used to provide further sectionalization of the line or to supply branches extending in other directions and on such occasions some or all of the advantages described above may be attained by incorporating my invention with the particular circuit.

While for convenience I have described my electrical arrangement with respect to two power lines it is to be understood that additional power lines may be protected in the same manner by adding an additional circuit breaker at each substation, an additional tie breaker and an additional series pilot control circuit.

Thus in accordance with my invention, I have provided in an electrical system having a plurality of electrical power lines supplied with electrical energy from remotely spaced common sources of electrical power, an electrical arrangement wherein maximum use is obtained of the copper in the power lines with a minimum number of circuit breakers while at the same time providing for automatic isolation of any of the power lines having an electrical fault thereon.

Also my invention provides the advantage of an arrangement for supervisory control of individual circuit breakers associated with a particular line having an electrical fault thereon during the period of the electrical fault and until automatic pilot control is re-established.

I have further provided additional flexibility of the system by providing further sectionalization of the power lines without the disadvantage of adding additional circuit breakers and have thus avoided the cost of additional circuit breakers and requisite housing for the same.

While I have shown and described a particular embodiment of my invention, it will be obvious to those skilled in the art that various changes and modifications may be made without departing from my invention in its broader aspects and I, therefore, aim in the appended claim to cover all such changes and modifications as fall within the true spirit and scope of my invention.

What I claim as new and desire to secure by Letters Patent of the United States is:

In an electrical power system having a plurality of power lines supplied with electrical power from common power sources remotely spaced one from the other along the power lines and each power source having a plurality of line circuit breakers connected one to each of the power lines, an arrangement comprising a tie line located at a point substantially equidistant from the power sources, a plurality of tie line circuit breakers each connecting one of said power lines to said tie line to provide maximum utilization of the conducting material of the power lines and a minimum use of tie line circuit breakers, a plurality of series electrical circuits one associated with each power line, contact means in each of said series circuit, said contact means being arranged to interrupt said series circuit when one of said circuit breakers associated with that series circuit is opened in response to an electrical fault on a power line supplied by that breaker, relay means associated with each series circuit, said relay means being cooperatively arranged to trip all of the remaining circuit breakers supplying electrical power to a particular power line when the one of said series circuits associated with the particular line is interrupted thereby to provide automatic isolation of each power line when an electrical fault occurs thereon, disconnecting means associated with each of said power lines and each of said series circuits and resistance means associated with said disconnecting means, said disconnecting means and said resistance means being cooperatively arranged to permit manual isolation of a portion of a power line having an electrical fault thereon to re-establish automatic control on the remainder of said line.

GORDON R. McDONALD.

REFERENCES CITED

The following references are of record in the file of this patent:

UNITED STATES PATENTS

| Number | Name | Date |
|---|---|---|
| 1,163,997 | Harris | Dec. 14, 1915 |
| 2,276,675 | Scott | Mar. 17, 1942 |
| 2,335,103 | Bolsterli | Nov. 23, 1943 |

FOREIGN PATENTS

| Number | Country | Date |
|---|---|---|
| 109,679 | Great Britain | Sept. 27, 1917 |